United States Patent
Sukegawa et al.

(10) Patent No.: US 12,025,065 B2
(45) Date of Patent: Jul. 2, 2024

(54) INTERNAL COMBUSTION ENGINE CONTROL UNIT

(71) Applicant: Hitachi Astemo, Ltd., Hitachinaka (JP)

(72) Inventors: Yoshihiro Sukegawa, Tokyo (JP); Masayuki Saruwatari, Hitachinaka (JP); Shinya Sato, Hitachinaka (JP); Yoshiaki Nagasawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/595,675

(22) PCT Filed: Mar. 27, 2020

(86) PCT No.: PCT/JP2020/013950
§ 371 (c)(1),
(2) Date: Nov. 22, 2021

(87) PCT Pub. No.: WO2020/235218
PCT Pub. Date: Nov. 26, 2020

(65) Prior Publication Data
US 2022/0220908 A1 Jul. 14, 2022

(30) Foreign Application Priority Data
May 23, 2019 (JP) .................................. 2019-096490

(51) Int. Cl.
*F02D 35/02* (2006.01)
*F02D 21/08* (2006.01)
(Continued)

(52) U.S. Cl.
CPC ........... *F02D 35/028* (2013.01); *F02D 21/08* (2013.01); *F02D 29/06* (2013.01); *F02D 37/02* (2013.01);
(Continued)

(58) Field of Classification Search
CPC ............... F02D 21/08; F02D 2021/083; F02D 2200/1002; F02D 2200/101;
(Continued)

(56) References Cited

U.S. PATENT DOCUMENTS 4,399,802 A * 8/1983 Oshiage .................. F02P 9/007
123/406.24
5,020,360 A * 6/1991 Brosi ..................... F02D 35/028
73/114.16
(Continued)

FOREIGN PATENT DOCUMENTS

EP 1559898 A1 * 8/2005 ......... F02D 41/1498
JP H01190947 A * 8/1989
(Continued)

OTHER PUBLICATIONS

International Search Report (PCT/ISA/210) issued in PCT Application No. PCT/JP2020/013950 dated Jul. 28, 2020 with English translation (six (6) pages).
(Continued)

*Primary Examiner* — John M Zaleskas
(74) *Attorney, Agent, or Firm* — Crowell & Moring LLP

(57) ABSTRACT

Provided is an internal combustion engine control unit that controls an engine by detecting combustion characteristics with a simple configuration robust to disturbance such as noise. Therefore, the internal combustion engine control unit (ECU 12) of the present embodiment includes a rotational speed calculation unit 122a that calculates a crank rotational speed of an internal combustion engine (engine 1); an extreme value timing calculation unit 122b that calculates an extreme value timing of the crank rotational speed calculated by the rotational speed calculation unit 122a; and a combustion state estimation unit (combustion phase calculation unit 122c) that estimates a combustion state based on
(Continued)

the extreme value timing of the crank speed calculated by the extreme value timing calculation unit 122*b*.

14 Claims, 12 Drawing Sheets

(51) Int. Cl.
| | |
|---|---|
| *F02D 29/06* | (2006.01) |
| *F02D 37/02* | (2006.01) |
| *F02D 41/14* | (2006.01) |
| *F02D 45/00* | (2006.01) |
| *F02M 26/53* | (2016.01) |
| *F02P 5/15* | (2006.01) |
| *F02M 26/52* | (2016.01) |

(52) U.S. Cl.
CPC ......... *F02D 41/1498* (2013.01); *F02D 45/00* (2013.01); *F02M 26/53* (2016.02); *F02P 5/1502* (2013.01); *F02D 2200/1002* (2013.01); *F02D 2200/101* (2013.01); *F02D 2200/1012* (2013.01); *F02M 26/52* (2016.02); *F02P 5/15* (2013.01)

(58) Field of Classification Search
CPC ........... F02D 2200/1012; F02D 35/028; F02D 41/0097; F02D 41/1498; F02P 5/15; F02P 5/1502; F02M 26/52; F02M 26/53
See application file for complete search history.

(56) References Cited

U.S. PATENT DOCUMENTS

| | | | | |
|---|---|---|---|---|
| 5,111,405 A * | 5/1992 | Maeda | ................. | F02P 5/1556 123/436 |
| 5,471,869 A * | 12/1995 | Kuroda | ................. | G01M 15/11 73/114.04 |
| 5,913,299 A * | 6/1999 | Shimizu | ................. | F02D 41/068 123/436 |
| 6,505,594 B1 * | 1/2003 | Katayama | ................. | F02P 5/06 123/179.18 |
| 6,560,526 B1 * | 5/2003 | Matekunas | ......... | F02D 41/1498 123/480 |
| 11,703,004 B2 * | 7/2023 | Sukegawa | ........... | F02D 41/1498 123/350 |
| 2002/0050271 A1 * | 5/2002 | Hasegawa | ........... | F02D 41/1498 123/406.45 |
| 2003/0061869 A1 * | 4/2003 | Fuerhapter | ............ | F02D 35/028 73/114.01 |
| 2004/0050363 A1 * | 3/2004 | Yamaoka | ............... | B60W 10/10 123/436 |
| 2007/0084442 A1 * | 4/2007 | Nakagawa | .......... | G01M 15/048 73/114.02 |
| 2007/0294022 A1 * | 12/2007 | Sameshima | ............... | F02D 9/02 701/102 |
| 2008/0148835 A1 * | 6/2008 | Akimoto | ............... | B60W 30/20 73/116.01 |
| 2008/0162017 A1 * | 7/2008 | Nagata | ................. | F02D 35/023 701/103 |
| 2008/0319632 A1 * | 12/2008 | Miyashita | ............. | F02D 35/023 701/102 |
| 2008/0319725 A1 * | 12/2008 | Chauvin | ............. | F02D 41/0097 703/8 |
| 2009/0112444 A1 * | 4/2009 | Ishizuka | ............. | F02D 41/3845 701/108 |
| 2009/0282903 A1 * | 11/2009 | Nagano | ................. | G01P 3/489 73/114.15 |
| 2009/0312932 A1 * | 12/2009 | Wang | ................. | F02D 41/1498 701/102 |
| 2010/0318280 A1 * | 12/2010 | Moriya | ................. | F02D 35/023 123/90.15 |
| 2011/0126803 A1 * | 6/2011 | Soejima | ................. | F02P 5/153 123/406.26 |
| 2012/0037120 A1 * | 2/2012 | Dietl | ..................... | F02D 41/123 123/436 |
| 2012/0046850 A1 * | 2/2012 | Yasuda | ................. | F02D 35/024 701/102 |
| 2015/0159569 A1 * | 6/2015 | Yu | ......................... | F02D 41/009 73/114.16 |
| 2015/0315993 A1 * | 11/2015 | Nagai | ................... | F02D 35/023 701/102 |
| 2015/0369166 A1 * | 12/2015 | Kurata | ................ | F02D 41/1498 123/435 |
| 2016/0097335 A1 * | 4/2016 | Dietl | .................... | F02D 41/2438 701/106 |
| 2016/0245195 A1 * | 8/2016 | Imaeda | ................. | F02D 35/024 |
| 2017/0037792 A1 * | 2/2017 | Imaeda | ............... | F02D 41/1401 |
| 2017/0074204 A1 * | 3/2017 | Takamiya | ........... | F02D 13/0242 |
| 2017/0115172 A1 * | 4/2017 | Ogawa | ................. | F02D 41/0097 |
| 2017/0184018 A1 * | 6/2017 | Imaeda | ................. | F02D 35/028 |
| 2017/0184019 A1 * | 6/2017 | Imaeda | ................. | G01N 25/22 |
| 2017/0204795 A1 * | 7/2017 | Hagari | ................. | F02D 41/1497 |
| 2017/0276098 A1 * | 9/2017 | Tanaka | ................. | F02D 41/3094 |
| 2017/0292466 A1 * | 10/2017 | Hagari | ................. | F02D 41/009 |
| 2019/0368429 A1 * | 12/2019 | Urano | ................... | F02D 41/005 |
| 2021/0079857 A1 * | 3/2021 | Aono | ................. | F02D 41/1401 |
| 2021/0372334 A1 * | 12/2021 | Ogawa | ................. | F02D 35/024 |
| 2023/0016942 A1 * | 1/2023 | Sukegawa | ........... | F02D 41/0097 |
| 2023/0054131 A1 * | 2/2023 | Sukegawa | ............. | F02D 35/028 |

FOREIGN PATENT DOCUMENTS

| | | | | |
|---|---|---|---|---|
| JP | 7-42607 A | | 2/1995 | |
| JP | 2001123875 A | * | 5/2001 | ......... F02D 41/1498 |
| JP | 2001193548 A | * | 7/2001 | ......... F02D 41/1498 |
| JP | 2002221071 A | * | 8/2002 | |
| JP | 2004003390 A | * | 1/2004 | |
| JP | 2006-177247 A | | 7/2006 | |
| JP | 2007-170203 A | | 7/2007 | |
| JP | 2007170203 A | * | 7/2007 | |
| JP | 2009-103063 A | | 5/2009 | |
| JP | 2009174483 A | * | 8/2009 | |
| JP | 2010190174 A | * | 9/2010 | |
| JP | 2011-163312 A | | 8/2011 | |
| JP | 2014148898 A | * | 8/2014 | |
| JP | 2016011600 A | * | 1/2016 | |
| JP | 2017-129051 A | | 7/2017 | |
| JP | 2017-150393 A | | 8/2017 | |
| WO | WO-2017065672 A1 | * | 4/2017 | |

OTHER PUBLICATIONS

Japanese-language Written Opinion (PCT/ISA/237) issued in PCT Application No. PCT/JP2020/013950 dated Jul. 28, 2020 (four (4) pages).
Japanese-language Office Action issued in Japanese Application No. 2019-096490 dated Feb. 28, 2023 with English translation (13 pages).
Chinese-language Office Action issued in Chinese Application No. 202080028465.1 dated Feb. 14, 2023 with English translation (17 pages).
Japanese-language Office Action issued in Japanese Application No. 2019-096490 dated Jul. 4, 2023 with English translation (10 pages).

* cited by examiner

CRANK ANGLE SENSOR

ROTATIONAL SPEED CALCULATION UNIT

CYCLE AVERAGE ROTATIONAL SPEED

EXTREME VALUE TIMING CALCULATION UNIT

CYLINDER WINDOW OF THREE-CYLINDER FOUR-CYCLE ENGINE

DEFINITION OF LOCAL CRANK ANGLE

CALCULATION OF MAXIMUM TIMING OF ROTATIONAL SPEED

CALCULATION OF MINIMUM TIMING OF ROTATIONAL SPEED

ESTIMATION OF COMBUSTION CENTROID POSITION FROM $\theta_{max}$

ESTIMATION OF COMBUSTION CENTROID POSITION FROM $\theta_{min}$

ESTIMATION OF INITIAL COMBUSTION POSITION FROM $\theta_{max}$ $\Delta\theta_{ig10\_current} = MFB10_{current} - \theta_{ig\_current}$ ESTIMATION OF INITIAL COMBUSTION POSITION FROM $\theta$min $\Delta \theta_{ig10\_current} = MFB10_{current} - \theta_{ig\_current}$

CONTROL BLOCK VIEW OF IGNITION TIMING

RELATIONSHIP BETWEEN INITIAL COMBUSTION PERIOD AND COMBUSTION STABILITY

EGR CONTROL BLOCK VIEW

INTERNAL COMBUSTION ENGINE CONTROL UNIT

TECHNICAL FIELD

The present invention relates to an internal combustion engine control unit, and particularly relates to a technique for controlling an engine by detecting combustion characteristics with a simple configuration robust to disturbance such as noise.

BACKGROUND ART

In recent years, in vehicles such as automobiles, regulations on fuel consumption (fuel consumption) and exhaust gas harmful components have been strengthened, and such regulations tend to be further strengthened in the future. In particular, regulations on the fuel consumption are matters of great interest due to problems such as fuel price increase, influence on global warming, and energy resource depletion.

Under such circumstances, there is known a technique of estimating a state in an engine combustion chamber and controlling an engine based on an estimation result. By appropriately controlling ignition timing, fuel injection timing, and the like according to the current combustion state, the thermal efficiency of the engine can be enhanced. An example of such a combustion state estimation technique is disclosed in, for example, PTL 1.

PTL 1 discloses "means for calculating a rotational acceleration of an engine, and means for estimating a combustion state in a combustion chamber based on the rotational acceleration". Further, PTL 1 discloses that "a calculate rotation position at which rotational acceleration of an engine output shaft becomes an exemplary value, and estimate a combustion state based on the rotation position".

CITATION LIST

Patent Literature

PTL 1: JP 2017-150393 A

SUMMARY OF INVENTION

Technical Problem

In recent years, a hybrid vehicle that supplies electric power generated by an engine to a motor to drive an axle has been widely used. In a hybrid system, the engine can avoid operation at low load and low rotational speed with low thermal efficiency, and the thermal efficiency of the entire system can be increased.

On the other hand, in the hybrid system, an engine is often operated under a constant load condition of a relatively high rotational speed, and a change in the rotational speed within an engine cycle is smaller than that of a general engine vehicle.

In addition, in the hybrid system, the system becomes complicated and the number of components increases as compared with the engine vehicle. Therefore, simplification of the system and reduction of cost are problems.

In the internal combustion engine control unit disclosed in PTL 1, the state in the engine combustion chamber is estimated based on the rotational acceleration of the engine. Since the rotational acceleration is a differential value of the rotational speed, a SN ratio with respect to the rotational acceleration decreases when the change in the rotational speed is small, and there is a possibility that estimation accuracy of the combustion state deteriorates due to noise or the like.

In addition, it is necessary to mount a circuit or software for calculating the rotational acceleration from the rotational speed on a controller, which may make the system complicated or the cost increased.

The present invention has been made in view of the above circumstances, and an object of the present invention is to provide a simple and low-cost internal combustion engine control unit capable of robustly estimating a combustion state with respect to a rotation state of an engine.

Solution to Problem

In order to solve the above problems, an internal combustion engine control unit of the present invention includes: a rotational speed calculation unit that calculates a crank rotational speed of an internal combustion engine; an extreme value timing calculation unit that calculates an extreme value timing of the crank rotational speed calculated by the rotational speed calculation unit; and a combustion state estimation unit that estimates a combustion state based on the extreme value timing of crank speed calculated by the extreme value timing calculation unit.

Advantageous Effects of Invention

According to the present invention, it is possible to provide an internal combustion engine control unit that controls an engine by detecting combustion characteristics with a simple configuration robust to disturbance such as noise.

Problems, configurations, and effects other than those described above will be clarified by the following description of embodiments.

DESCRIPTION OF EMBODIMENTS

Figure 1:
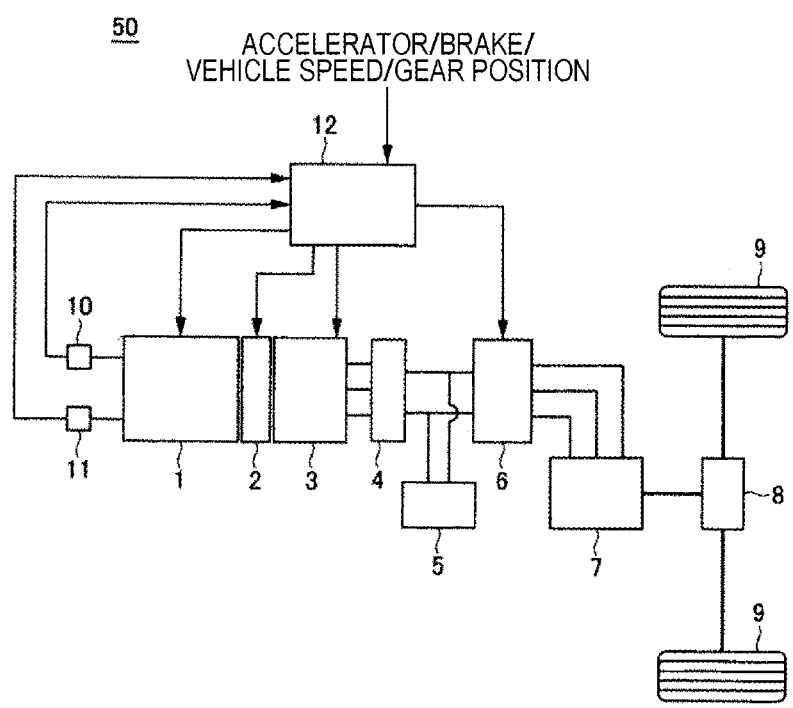
FIG. 1 is an explanatory diagram illustrating an example of a system configuration of a hybrid vehicle according to an embodiment of the present invention.

Hereinafter, examples of modes for carrying out the present invention (hereinafter, it is described as "embodiment") will be described with reference to the accompanying drawings. In the present specification and the accompanying drawings, components having substantially the same function or configuration are denoted by the same reference numerals, and redundant description is omitted.

1. First Embodiment

[System Configuration of Hybrid Vehicle]

First, an example of a system configuration of a hybrid vehicle to which the present invention is applied will be described.

FIG. 1 is an explanatory diagram illustrating an example of a system configuration of a hybrid vehicle according to an embodiment of the present invention. In the hybrid vehicle illustrated in FIG. 1, an engine 1, an accelerating gear 2, and an induction generator 3 are connected in series. A shaft output of the engine 1 is accelerated to a rotational speed suitable for the induction generator 3 by the accelerating gear 2 to drive the induction generator 3. Three-phase AC power generated by the induction generator 3 is converted into DC power by a rectifier 4 and then supplied to an inverter 6 and a battery 5. The DC power is converted into the three-phase AC power again by the inverter 6 and then supplied to an induction motor 7. The induction motor 7 drives left and right wheels 9 via a transaxle 8.

A controller 12 is an example of a hybrid vehicle control device that controls each component of a hybrid vehicle 50 and executes various data process. For example, the controller 12 obtains a motor output necessary for driving the vehicle from information such as an accelerator, a brake, a vehicle speed, and a gear position, and controls the inverter 6 to supply a predetermined amount of power to the induction motor 7. In addition, the controller 12 controls the output of the engine 1, an accelerating ratio of the accelerating gear 2, and a field current of the induction generator 3, and manages the entire power system of the vehicle. An electronic control unit (ECU) is used as the controller 12 as an example.

[Engine]

Figure 2:
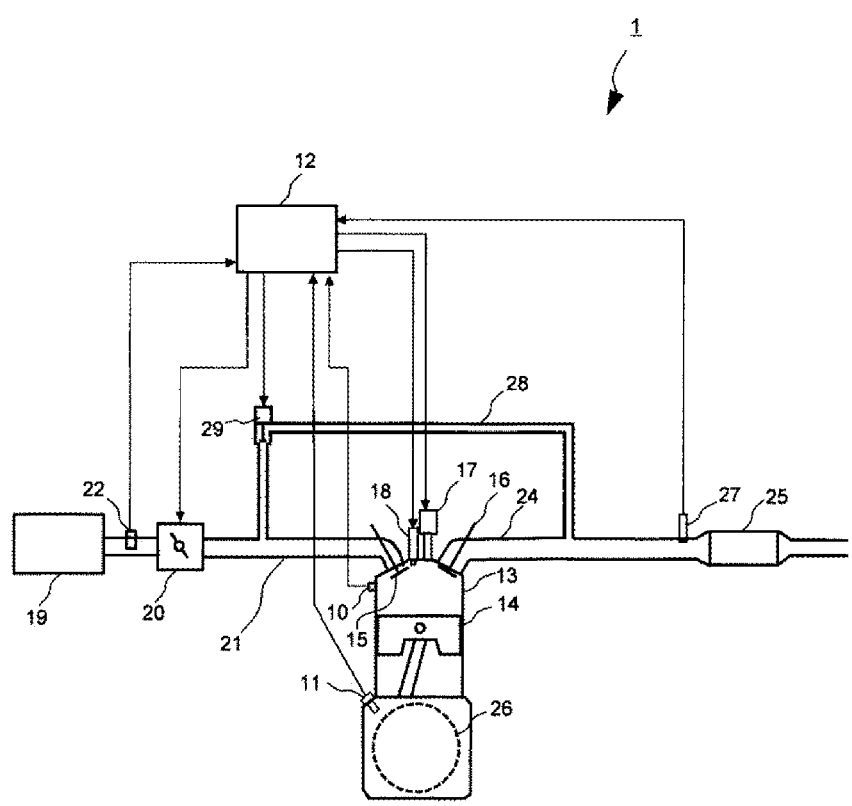
FIG. 2 is an explanatory diagram illustrating an example of a cross section of an engine according to an embodiment of the present invention.

FIG. 2 illustrates an example of a cross section of the engine 1. The engine 1 is an example of a spark ignition 4-cycle gasoline engine, and a combustion chamber is formed by an engine head, a cylinder 13, a piston 14, an intake valve 15, and an exhaust valve 16. In the engine 1, a fuel injection valve 18 is provided in the engine head, and the injection nozzle of the fuel injection valve 18 penetrates into the combustion chamber, so that a so-called in-cylinder direct injection type internal combustion engine is configured. An ignition plug 17 is also provided in the engine head. The air for combustion is taken into the combustion chamber through an air cleaner 19, a throttle valve 20, and an intake port 21. The gas after combustion (exhaust gas) discharged from the combustion chamber is discharged to the atmosphere through an exhaust port 24 and a catalytic converter 25.

The amount of air taken into the combustion chamber is measured by an air flow sensor 22 provided on the upstream side of the throttle valve 20. An air-fuel ratio of the gas (exhaust) discharged from the combustion chamber is detected by an air-fuel ratio sensor 27 provided on the upstream side of the catalytic converter 25. In addition, a knock sensor 10 is provided in a cylinder block (not illustrated) having a structure in which the cylinder 13 and a crankcase are integrated. The knock sensor 10 outputs a detection signal corresponding to a knock state quantity in the combustion chamber.

The exhaust port 24 and the intake port 21 communicate with each other by an EGR pipe 28, and a so-called exhaust gas recirculation system (EGR) in which a part of the exhaust gas flowing through the exhaust port 24 is returned to the inside of the intake port 21 is configured. The amount of gas flowing through the EGR pipe 28 is adjusted by an EGR valve 29.

Furthermore, a timing rotor 26 (signal rotor) is provided in a shaft portion of a crankshaft. The crank angle sensor 11 disposed on the timing rotor 26 detects a signal of the timing rotor 26 to detect the rotation and the phase of the crankshaft, that is, the engine rotational speed. Detection signals of the knock sensor 10 and the crank angle sensor 11 are taken into the controller 12 and used for state detection and operation control of the engine 1 in the controller 12.

The controller 12 outputs the opening of the throttle valve 20, the opening of the EGR valve 29, the fuel injection timing by the fuel injection valve 18, the ignition timing by the ignition plug 17, and the like to control the engine 1 to a predetermined operation state.

Although only a single cylinder is illustrated in FIG. 2 to illustrate the configuration of the combustion chamber of the engine 1, the engine 1 according to the embodiment of the present invention may be a multi-cylinder engine including a plurality of cylinders.

[Crank Angle Sensor]

Figure 3:
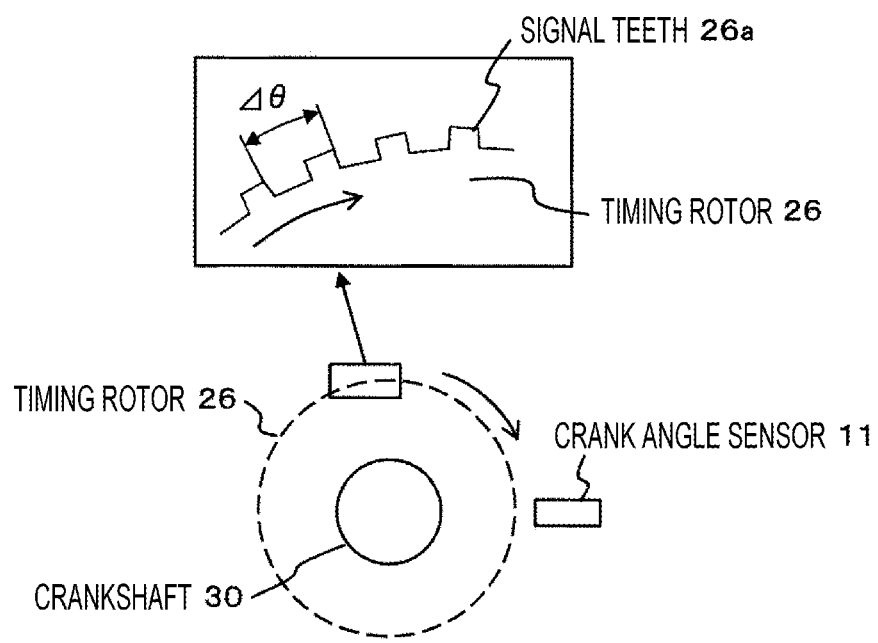
FIG. 3 is an explanatory diagram illustrating a principle of rotational speed detection by a crank angle sensor according to an embodiment of the present invention.

FIG. 3 is a diagram illustrating a principle of detecting the engine rotational speed using the crank angle sensor 11 and the timing rotor 26. On the circumference of the timing rotor 26 attached to a crankshaft 30 of the engine, signal teeth 26a are provided at constant angular intervals Δθ. The crank angle sensor 11 detects a time difference Δt between the adjacent signal teeth 26a passing through the detector of the crank angle sensor 11, and obtains an engine rotational speed ω=Δθ/Δt (rad/s). Since the crank angle sensor has such a rotational speed detection principle, the engine rotational speed is detected for each rotation angle Δθ, and the rotational speed is an average speed between the rotation angles Δθ.

[Controller]

Figure 4:
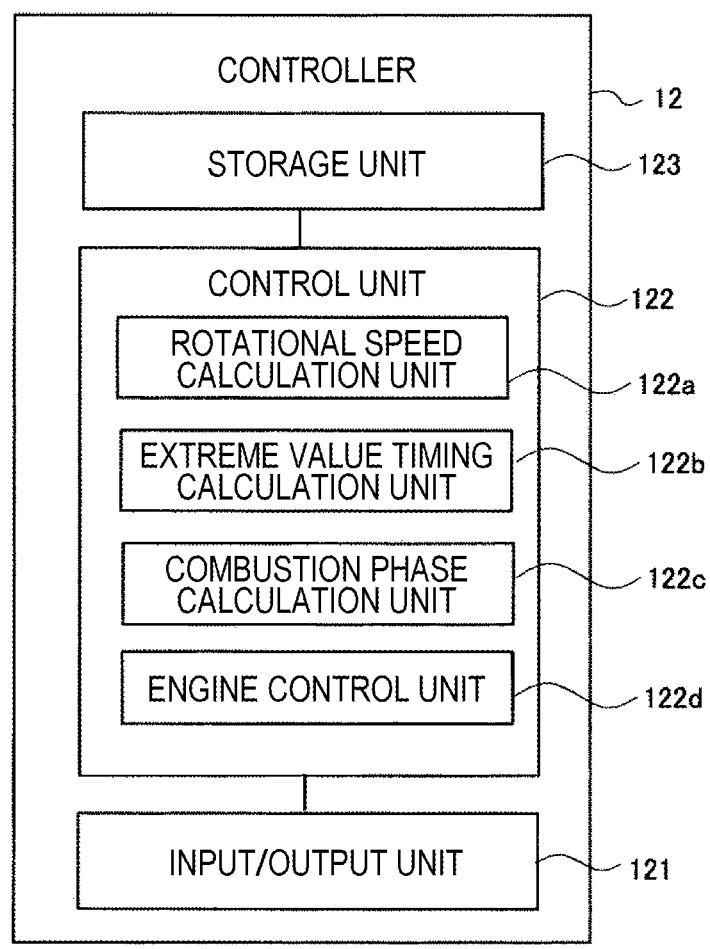
FIG. 4 is a block view illustrating a configuration example of a controller according to an embodiment of the present invention.

FIG. 4 is a block view illustrating a configuration example of the controller 12. The controller 12 includes an input/output unit 121, a control unit 122, and a storage unit 123 electrically connected to each other via a system bus (not illustrated).

The input/output unit 121 includes an input port and an output port (not illustrated), and performs an input and output process on each device and each sensor in the vehicle. For example, the input/output unit 121 reads a signal of the crank angle sensor and transmits the signal to the control unit 122. The control unit 122 is an arithmetic processing unit, and a central processing unit (CPU) or a micro processing unit (MPU) can be used. In addition, the input/output unit 121 outputs a control signal to each device according to a command of the control unit 122.

The control unit 122 controls a power system of the vehicle. For example, the control unit 122 controls the ignition timing, the throttle opening degree, and the EGR opening degree according to the combustion phase of the engine 1 including the internal combustion engine.

The control unit 122 includes a rotational speed calculation unit 122a, an extreme value timing calculation unit 122b, a combustion phase calculation unit 122c, and an engine control unit 122d.

The rotational speed calculation unit 122a averages the time-series data of the engine rotational speed and removes harmonic components, and outputs the obtained time-series data of the engine rotational speed to the extreme value timing calculation unit 122b.

The extreme value timing calculation unit 122b obtains the crank angle timing at which the rotational speed becomes the maximum value or the minimum value from the time-series data of the engine rotational speed input from the rotational speed calculation unit 122a, and outputs the result to the combustion phase calculation unit 122c.

The combustion phase calculation unit 122c obtains the combustion phase based on the maximum value timing or the minimum value timing of the engine rotational speed obtained by the extreme value timing calculation unit 122b, and outputs the result to the engine control unit 122d.

The engine control unit 122d controls the engine 1 based on the combustion phase obtained by the combustion phase calculation unit 122c.

The storage unit 123 is a volatile memory such as a random access memory (RAM) or a nonvolatile memory such as a read only memory (ROM). A control program executed by the control unit 122 (arithmetic processing device) included in the controller 12 is recorded in the storage unit 123. The control unit 122 reads the control program from the storage unit 123 and executes the control program, whereby the function of each block of the control unit 122 is realized. Note that the controller 12 may include a non-volatile auxiliary storage device including a semiconductor memory or the like, and the control program may be stored in the auxiliary storage device.

The present invention is desirably applied to engine control of a hybrid vehicle of a type in which an engine is dedicated to power generation. However, it is of course also possible to apply to a hybrid vehicle in which the engine is not dedicated to power generation. The present invention can also be applied to a non-hybrid vehicle in which only an engine is used as a driving source of the vehicle.

[Rotational Speed Calculation Unit]

Figure 5:
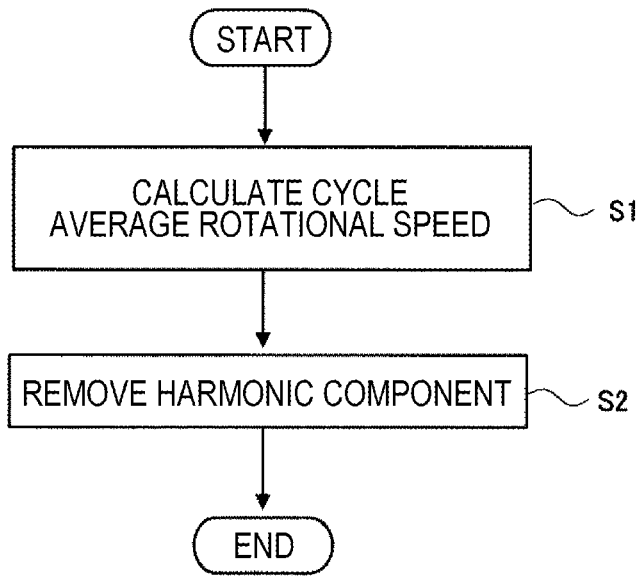
FIG. 5 is an explanatory diagram illustrating a processing procedure of a rotational speed calculation unit of the controller according to the embodiment of the present invention.

FIG. 5 illustrates a processing procedure example by the rotational speed calculation unit 122a. The rotational speed calculation unit 122a obtains time-series data of the cycle average engine rotational speed from the engine rotational speed data detected by the crank angle sensor 11 (S1). This is to prevent the estimation result of the combustion state from being adversely affected when the engine rotational speed varies for each cycle.

Figure 6:
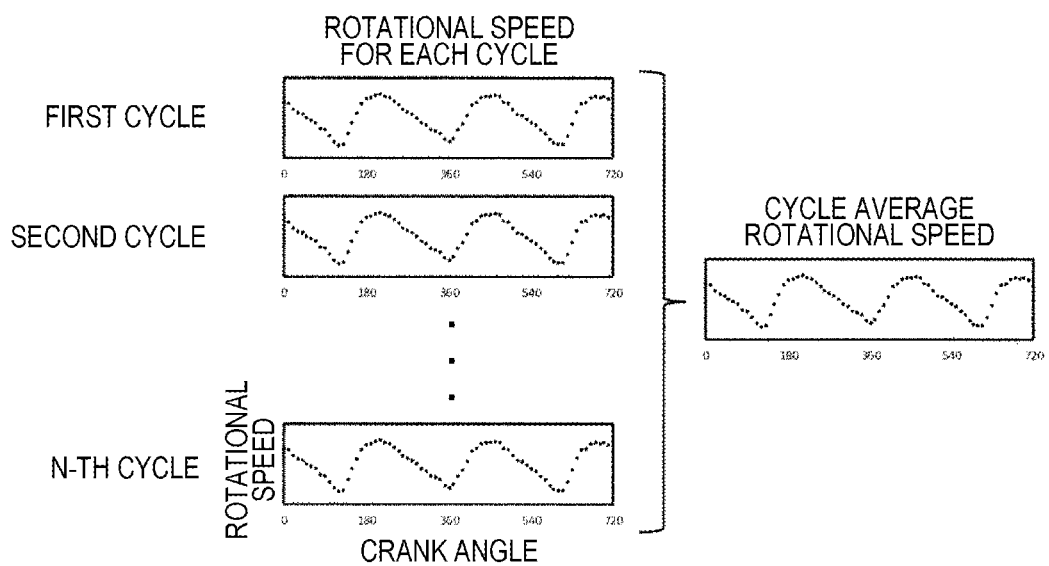
FIG. 6 is an explanatory diagram illustrating a method of obtaining time-series data of a cycle average rotational speed according to an embodiment of the present invention.

A specific method of obtaining the time-series data of the cycle average engine rotational speed will be described with reference to FIG. 6. The rotational speed calculation unit 122a takes in the rotational speed data obtained for each constant crank angle Δθ by the crank angle sensor 11 as time-series data for one engine cycle (period for crank angle of 720°). For example, in the case of Δθ=10°, the rotational speed calculation unit 122a takes in the time-series data of the rotational speed including a total of 72 points from the crank angle of 10° to 720°. The left diagram of FIG. 6 illustrates an example of the time-series data of the rotational speed for each cycle captured in this manner.

The taking of the rotational speed data for each cycle is repeated a predetermined cycle number N (for example, 100 cycles), and time-series data of the cycle average engine rotational speed is obtained by Equation (1). The engine rotation speed data at each discrete point is averaged at a predetermined cycle number N, so that the time-series data of the engine rotation speed from which the cycle variation is removed is obtained.

[Equation 1]

$$\overline{\omega(\theta)} = \frac{\sum_{i=1}^{N} \omega(\theta)_i}{N} \quad \text{Equation 1}$$

ω: Rotational speed
θ: Crank angle
N: Number of cycles to be averaged
i: Cycle

Returning to FIG. 5, the processing procedure by the rotational speed calculation unit 122a will be continuously described. Next, the rotational speed calculation unit 122a obtains the time-series data of the engine rotational speed obtained by removing harmonic components from the time-series data of the cycle average engine rotational speed (S2).

This process is performed to remove fluctuation components not related to combustion from the engine rotational speed. Examples of the rotational speed fluctuation component not related to combustion include rotational fluctuation due to mechanical backlash of the accelerating machine 2 provided between the engine 1 and the generator 3, and electrical noise included in a signal of the crank angle sensor 11. These are generally short-period fluctuations compared to engine rotational fluctuations generated by combustion torque, and thus can be removed by removing harmonic components from the rotational speed data. By removing the fluctuation component irrelevant to combustion from the rotational speed data, the estimation accuracy can be improved in the estimation of the combustion state based on the engine rotational fluctuation.

In order to remove the harmonic components from the rotational speed data, the rotational speed calculation unit 122a reconstructs time-series data of the engine rotational speed using Fourier series expansion represented by Equation (2). In the Fourier series expansion, the original function is reconstructed by adding sine functions having different frequencies. In Equation (2), k is the order of the sine function, and the larger k is, the higher the frequency becomes. Therefore, when the time-series data of the engine rotational speed is reconstructed using the Fourier series expansion, if the addition of the sine functions is terminated in an appropriate order, a frequency component higher than the order can be removed from the original data.

[Equation 2]

$$\widehat{\omega(\theta)} = \omega_0 + \sum_{k=1}^{n} \left\{ c_k \cos\frac{k \cdot 2\pi(\theta - \theta_0)}{\Theta} + s_k \sin\frac{k \cdot 2\pi(\theta - \theta_0)}{\Theta} \right\} \quad \text{Equation 2}$$

$$c_k = \frac{2}{\Theta} \int_{\theta_0}^{\theta_0 + \Theta} \overline{\omega(\theta)} \cos\frac{k \cdot 2\pi(\theta - \theta_0)}{\Theta} d\theta$$

$$s_k = \frac{2}{\Theta} \int_{\theta_0}^{\theta_0 + \Theta} \overline{\omega(\theta)} \sin\frac{k \cdot 2\pi(\theta - \theta_0)}{\Theta} d\theta$$

$\overline{\omega(\theta)}$: Original cycle average rotational speed
$\widehat{\omega(\theta)}$: Reconstructed cycle average rotational speed
$k$: Order of sine function
$\theta$: Crank angle
$\Theta$: Cycle period In a general 4-cylinder 4-cycle gasoline engine, a truncation order n of a sine function for removing harmonic components not related to combustion from rotational speed data is desirably about 3 to 5. However, it is considered that the appropriate truncation order n changes depending on the configuration of the engine and the operating conditions. For example, when the number of engine cylinders increases, the frequency of the engine rotational fluctuation due to the combustion torque increases, and thus the truncation order is preferably larger in order to appropriately reconstruct the fluctuation component. In addition, even when the engine rotational speed increases, the frequency of the engine rotational fluctuation due to the combustion torque increases, and thus, it is preferable to further increase the truncation order. Therefore, when the truncation order n of the sine function is changed based on the engine rotational speed, the estimation accuracy can be improved over a wide operation range in the estimation of the combustion state based on the engine rotational fluctuation.

As described above, the rotational speed calculation unit 122a calculates the crank rotational speed by expanding the time-series value of the crank rotational speed obtained from a rotation angle sensor in a finite order Fourier series. In addition, it is desirable to change the truncation order of the Fourier series expansion based on the crank rotational speed.

In addition, the extreme value timing calculation unit 122b divides the period of the crank rotational speed time-series value in the period for crank angle of 720° by the number of cylinders, and allocates the crank rotational speed time-series value in the period including the compression top dead center of each cylinder as the crank rotational speed time-series value in the cylinder. Further, the extreme value timing calculation unit 122b desirably calculates the extreme value timing of the crank rotational speed for each cylinder from the allocated crank rotational speed time-series value assigned to each cylinder. In addition, it is desirable that the extreme value timing calculation unit 122b approximates the time-series value of the crank rotational speed using a continuous function from the discrete time-series value of the crank rotational speed, and calculates the extreme value timing of the crank rotational speed using the continuous function.

[Extreme Value Timing Calculation Unit]

Next, the process of the extreme value timing calculation unit 122b in the controller 12 will be described.

Figure 7:
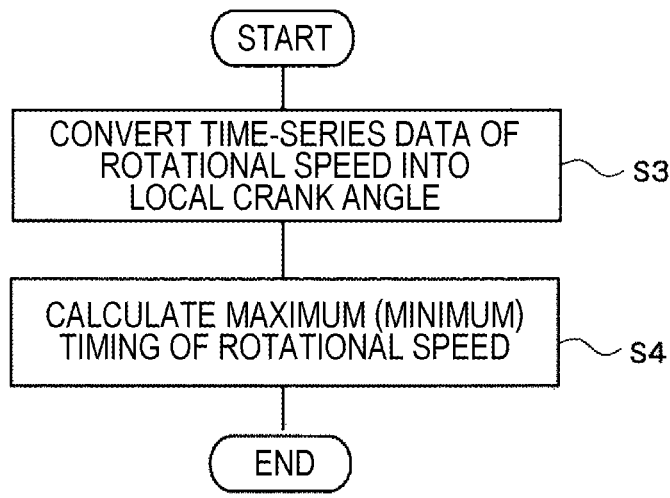
FIG. 7 is an explanatory diagram illustrating a processing procedure of an extreme value timing calculation unit of the controller according to the embodiment of the present invention.

FIG. 7 illustrates a processing procedure example by the extreme value timing calculation unit 122b.

The extreme value timing calculation unit 122b converts the time-series data of the engine rotational speed of the entire engine cycle (crank angle of 0° to 720°) into a local crank angle synchronized with the cycle of each engine cylinder (S3). Next, the crank angle timing at which the engine rotational speed becomes maximum (or minimum) is calculated from the time-series data of the engine rotational speed converted into the local crank angle (S4).

A local crank angle conversion process (S3) in the rotational speed calculation unit 122a will be described with reference to FIGS. 8 to 10.

Figure 8:
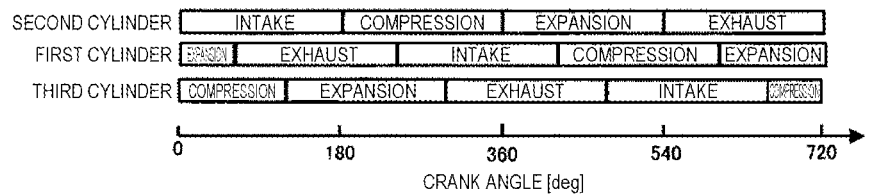
FIG. 8 is an explanatory diagram illustrating a stroke sequence of a three-cylinder four-cycle engine.

FIG. 8 is an explanatory diagram illustrating each stroke sequence of a three-cylinder four-cycle engine. In a four-cycle engine, four strokes of intake, compression, expansion, and exhaust are sequentially performed. In a three-cylinder engine, the stroke between the cylinders is shifted by a crank angle of 240°. When the ignition of the engine is performed in the order of the second cylinder, the first cylinder, and the third cylinder, the stroke of the first cylinder is delayed by 240° with respect to the second cylinder, and the stroke of the third cylinder is delayed by 240° with respect to the first cylinder.

The state of combustion is strongly reflected in the crank rotational speed in the vicinity of the compression top dead center of each cylinder where the in-cylinder pressure becomes maximum. Therefore, in process S3, the rotational speed data of the entire cycle (crank angle of 0° to 720°) is divided in a section with a crank angle of 240° around the compression top dead center of each cylinder. Then, each window is assigned as the rotational speed data of the cylinder including the compression top dead center in the window.

Figure 9:
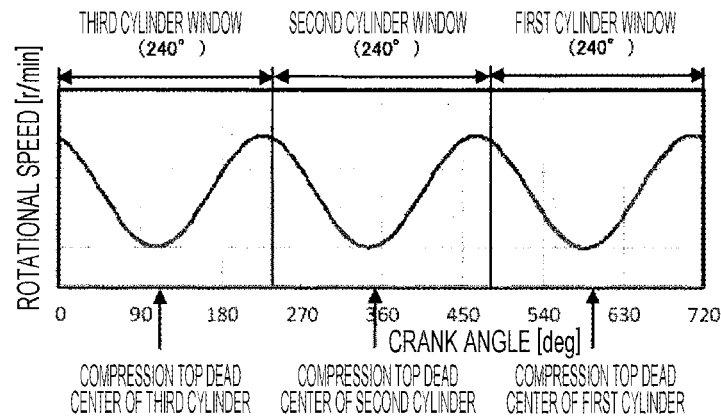
FIG. 9 is an explanatory diagram illustrating how to determine a cylinder window of the three-cylinder four-cycle engine according to the embodiment of the present invention.
Figure 10:
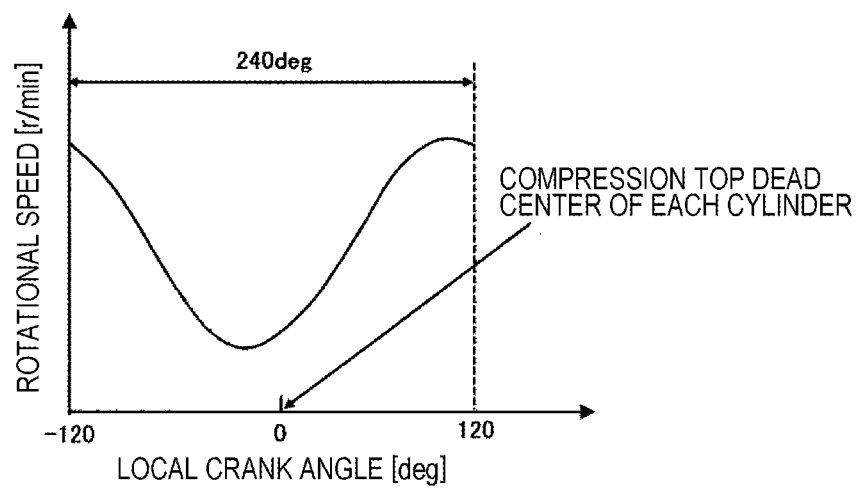
FIG. 10 is an explanatory diagram illustrating a definition of a local crank angle according to an embodiment of the present invention.

FIG. 9 illustrates an example in which a window having a width of 240° is set around the compression top dead center of each cylinder for the time-series data of the engine rotational speed. Since the section with the crank angle of 0° to 240° includes the compression top dead center of the third cylinder, this is assigned as the third cylinder window. Similarly, a section with a crank angle of 240° to 480° is assigned as the second cylinder window, and a section with a crank angle of 480° to 720° is assigned as the first cylinder window.

When each window is assigned in this manner, the combustion state of the third cylinder is more strongly reflected in the rotational speed data of the third cylinder window than in the rotational speed data of the other cylinder windows.

Similarly, the combustion state of the second cylinder is more strongly reflected in the rotational speed data of the second cylinder window than in the rotational speed data of the other cylinder windows, and the combustion state of the first cylinder is more strongly reflected in the rotational speed data of the first cylinder window than in the rotational speed data of the other cylinder windows. Therefore, the combustion state can be estimated for each cylinder by using the rotational speed data of each window.

Furthermore, in process S3, the rotational speed data of each window is converted into a local crank angle based on the compression top dead center of each cylinder. FIG. 10 illustrates an example in which the rotational speed data of each window is converted into the local crank angle. In this example, the time-series data of the rotational speed is redefined using the local crank angle of −120° to 120° in which the compression top dead center of each cylinder is set to 0. In the process S3, the time-series data of the rotational speed converted into the local crank angle for all the cylinder windows is created, and the data is delivered to the process S4.

Subsequently, in process S4, the timing at which the rotational speed becomes maximum or the timing at which the rotational speed becomes minimum is calculated from the time-series data of the rotational speed converted into the local crank angle.

Figure 11:
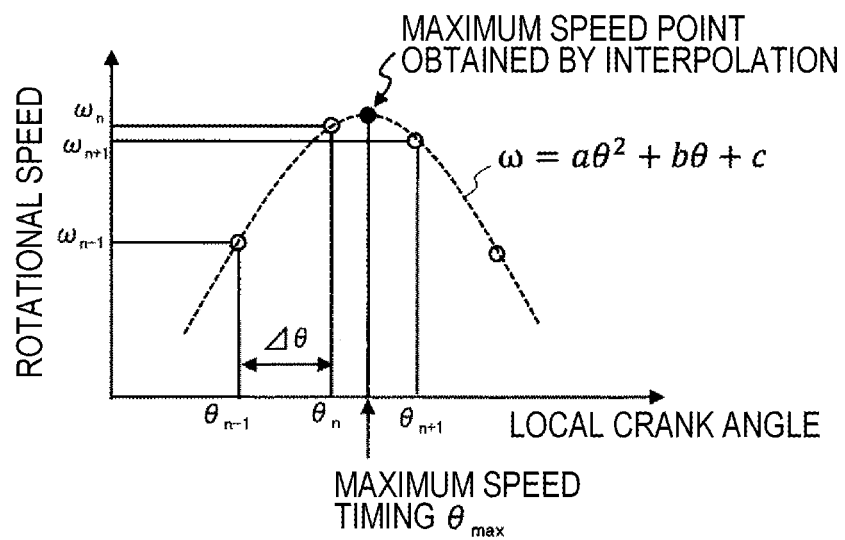
FIG. 11 is an explanatory diagram illustrating a method of calculating a maximum speed timing according to an embodiment of the present invention.

FIG. 11 illustrates a method of calculating the maximum timing of the rotational speed in process S4.

Since the time-series data of the rotational speed is discrete point data, a deviation occurs between the maximum timing of the rotational speed and the maximum timing of the actual rotational speed (the rotational speed indicated by a dotted line in FIG. 11) in the discrete point data. Therefore, in the process S4, the rotational speed is approximated by a polynomial from the discrete point data, and the maximum timing of the rotational speed is obtained from this approximate expression.

Therefore, in the process S4, first, a data point n at which the rotational speed is maximum is searched from the time-series data of the rotational speed which is discrete point data. Then, the local crank angle $\theta_{n-1}$ at a data point one time before the local crank angle $\theta_n$ at n and the rotational speed $\omega_n$, n and the local crank angle $\theta_{n+1}$ and the rotational speed $\omega_{n+1}$ at a data point one time after the rotational speed $\omega_{n-1}$, n are extracted.

Furthermore, in the process S4, the rotational speed ω is approximated by Equation 3, which is a quadratic function of the local crank angle θ. Here, a, b, and c are constants. In the process S4, a, b, and c are obtained by solving simultaneous ternary linear equations obtained by substituting $\theta_n$, $\omega_n$, $\theta_{n-1}$, $\omega_{n-1}$, $\theta_{n+1}$, and $\omega_{n+1}$ into Equation 3.

[Equation 3]

$$\omega = a\theta^2 + b\theta + c \qquad \text{Equation 3}$$

Since the differential value of Equation 3 becomes zero at the point where the rotational speed becomes the extreme value, the local crank angle (maximum speed timing) $\theta_{max}$ at which the rotational speed becomes the maximum is obtained from Equation 4 in process S4. $\theta_{max}$ of each cylinder is obtained by a similar procedure and delivered to the combustion phase calculation unit 122c.

[Equation 4]

$$\frac{d\omega}{d\theta} = 2a\theta_{max(min)} + b = 0 \qquad \text{Equation 4}$$

$$\theta_{max(min)} = -\frac{b}{2a}$$

In addition, also in the case of obtaining the minimum timing of the rotational speed in the process S4, the maximum timing of the rotational speed is obtained by the same method as in the case of obtaining the maximum timing of the rotational speed.

Figure 12:
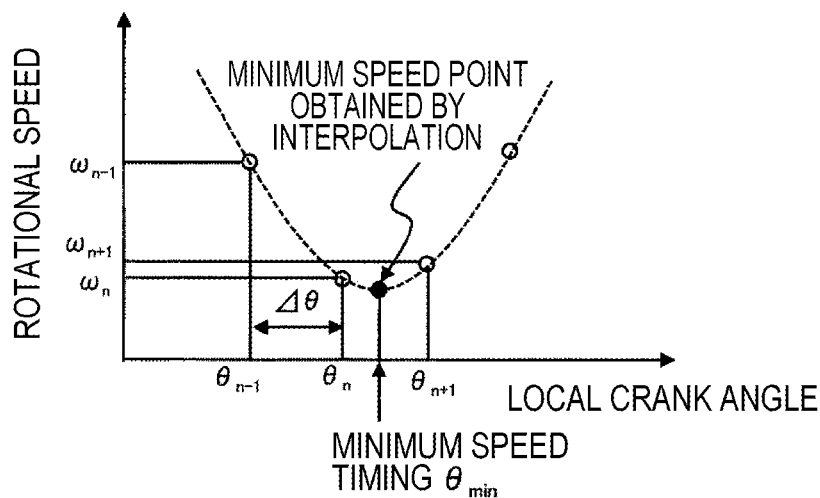
FIG. 12 is an explanatory diagram illustrating a method of calculating a minimum speed timing according to an embodiment of the present invention.

FIG. 12 illustrates a method of calculating the minimum timing of the rotational speed in process S4.

In the process S4, first, a data point n at which the rotational speed is minimum is searched from the time-series data of the rotational speed which is discrete point data. Then, the local crank angle $\theta_{n-1}$ at a data point one time before the local crank angle $\theta_n$ at n and the rotational speed $\omega_n$, n and the local crank angle $\theta_{n+1}$ and the rotational speed $\omega_{n+1}$ at a data point one time after the rotational speed $\omega_{n-1}$, n are extracted. Then, in the process S4, the constants a, b, and c of the quadratic function are obtained from Equation 3 using these values, and the local crank angle (minimum speed timing) $\theta_{min}$ at which the rotational speed is minimized is further obtained from Equation 4. $\theta_{min}$ of each cylinder is obtained by a similar procedure and delivered to the combustion phase calculation unit 122c.

In the above embodiment, the rotational speed ω is approximated by a quadratic function of the local crank angle θ, but the present invention is not limited thereto. For example, the rotational speed ω can be approximated using various continuous functions such as a cubic function and a sine function of the local crank angle θ.

[Combustion Phase Calculation Unit]

Next, a method of calculating the combustion phase by the combustion phase calculation unit 122c in the controller 12 will be described with reference to FIG. 13.

Figure 13:
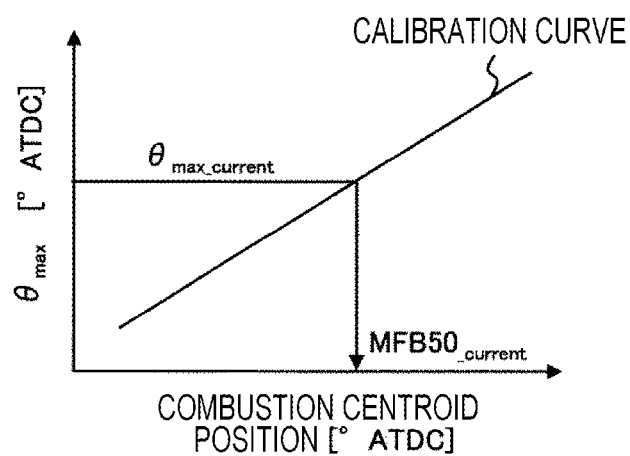
FIG. 13 is an explanatory diagram illustrating how to obtain a combustion centroid position from the maximum speed timing according to the embodiment of the present invention.

FIG. 13 is a diagram illustrating a correlation between the maximum timing $\theta_{max}$ of the engine rotational speed and a combustion centroid position MFB 50. Here, the mass fraction burned (MFB) is a ratio of a mass of a combusted portion to a mass of the entire air-fuel mixture, and the combustion centroid position MFB 50 indicates a crank angle when the combustion mass ratio becomes 50%. There is a strong correlation between the maximum timing $\theta_{max}$ of the engine rotational speed and the combustion centroid position MFB 50, and the relationship between the maximum timing $\theta_{max}$ and the combustion centroid position MFB is substantially linear as illustrated in FIG. 13. The reason for this will be described below.

The temporal change of the engine rotational speed is represented by a motion equation of the rotating body represented by Equation 5. Here, $T_c$ represents a combustion torque, and $T_L$ represents a load torque. As is clear from Equation 5, the rotational acceleration dω/dt and the combustion torque $T_c$ are in a proportional relationship, and when the combustion torque changes, the rotational acceleration changes accordingly. For example, when the combustion centroid position is retarded, the generation timing of the combustion torque is retarded, and in synchronization with this, the timing at which the rotational acceleration becomes maximum is delayed. Therefore, a strong correlation appears between the maximum timing of the rotational acceleration and the combustion centroid position.

[Equation 5]

$$I\frac{d\omega}{dt} = T_c - T_L \qquad \text{Equation 5}$$

ω: Rotational speed
$T_c$: Combustion torque
$T_L$: Load torque
I: Inertial moment
t: Time On the other hand, when the change in the load torque $T_L$ is small, the temporal change in the combustion torque is substantially sinusoidal. This is because the arm length of the crank that determines the magnitude of the combustion torque changes sinusoidally with the rotation of the crankshaft. When the rotational acceleration is sinusoidal, the rotational speed obtained by integrating the rotational acceleration is also sinusoidal, and a time-change waveform of the rotational acceleration and the time-change waveform of the rotational speed maintain a constant phase difference. Therefore, the phase difference between the maximum timing of the rotational acceleration and the maximum timing of the rotational speed is also constant, and the combustion centroid position has a strong correlation with not only the maximum timing of the rotational acceleration but also the maximum timing of the rotational speed. That is, in the present embodiment, a waveform indicating the crank rotational speed on a vertical axis with respect to the crank angle on a horizontal axis is desirably configured to be sinusoidal.

The correlation line between the maximum timing $\theta_{max}$ of the engine rotational speed and the combustion centroid position MFB 50 is obtained in advance by calibration or the like, and is stored in the ROM of the controller 12 in the form of a correlation formula or a reference table. The combustion phase calculation unit 122*c* obtains the current combustion centroid position MFB 50$_{current}$ from the maximum timing $\theta_{max\_current}$ of the current engine rotational speed delivered from the extreme value timing calculation unit 122*b* by using the correlation line between the maximum timing $\theta_{max}$ of the engine rotational speed and the combustion centroid position MFB 50 shown in FIG. 13. The current combustion centroid position MFB 50$_{current}$ is obtained for each cylinder in a similar procedure, and these are passed to the engine control unit 122*d* of the controller 12.

Even when the minimum timing $\theta_{min}$ of the engine rotational speed is used, the combustion centroid position can be obtained similarly to the case of the maximum timing $\theta_{max}$ of the engine rotational speed.

Figure 14:
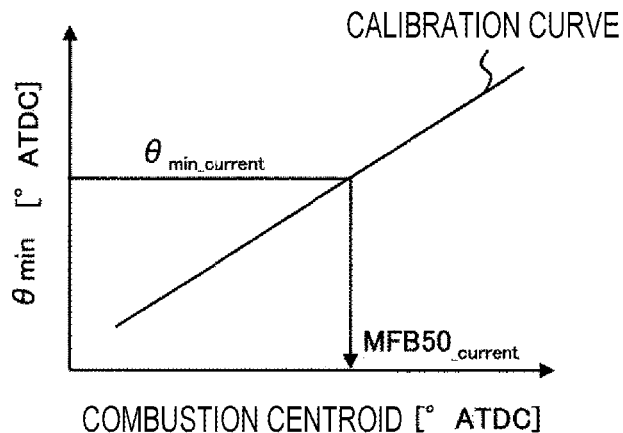
FIG. 14 is an explanatory diagram illustrating how to obtain a combustion centroid position from the minimum speed timing according to the embodiment of the present invention.

FIG. 14 is a diagram illustrating a correlation between the minimum timing $\theta_{min}$ of the engine rotational speed and the combustion centroid position MFB 50. There is a strong correlation between the minimum timing $\theta_{min}$ of the engine rotational speed and the combustion centroid position MFB 50, and the relationship between the minimum timing $\theta_{min}$ and the combustion centroid position MFB is substantially linear as illustrated in FIG. 14. The reason for this will be described below.

As described above, when the change in the load torque $T_L$ is small, the temporal change in the engine rotational speed is sinusoidal. Therefore, the maximum timing of the rotational speed and the minimum timing of the rotational speed have a substantially constant phase difference. Therefore, the combustion centroid position has a strong correlation with not only the maximum timing of the rotational speed but also the minimum timing of the rotational speed.

The correlation line between the minimum timing $\theta_{min}$ of the engine rotational speed and the combustion centroid position MFB 50 is obtained in advance by calibration or the like, and is stored in the ROM of the controller 12 in the form of a correlation formula or a reference table. The combustion phase calculation unit 122*c* obtains the current combustion centroid position MFB 50$_{current}$ from the minimum timing $\theta_{min\_current}$ of the current engine rotational speed delivered from the extreme value timing calculation unit 122*b* by using the correlation line between the minimum timing $\theta_{min}$ of the engine rotational speed and the combustion centroid position MFB 50 shown in FIG. 14. The current combustion centroid position MFB 50$_{current}$ is obtained for each cylinder in a similar procedure, and these are passed to the engine control unit 122*d* of the controller 12.

An initial combustion position MFB 10 (position at mass combustion ratio of 10%) can also be obtained using the maximum timing $\theta_{max}$ of the engine rotational speed.

Figure 15:
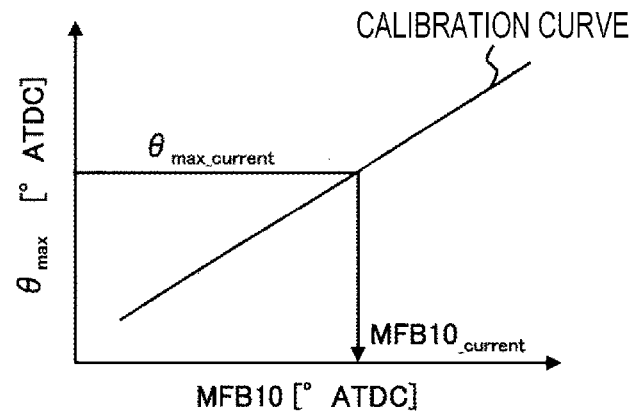
FIG. 15 is an explanatory diagram illustrating a method of obtaining an initial combustion position from the maximum speed timing according to the embodiment of the present invention.

FIG. 15 is a diagram illustrating a correlation between the maximum timing $\theta_{max}$ of the engine rotational speed and the initial combustion position MFB 10. There is a strong correlation between the maximum timing $\theta_{max}$ of the engine rotational speed and the initial combustion position MFB 10, and the relationship between the maximum timing $\theta_{max}$ and the combustion centroid position MFB is substantially linear as illustrated in FIG. 15. This is because when the initial combustion position changes, the generation timing of the combustion torque changes accordingly. Therefore, if the correlation line between the maximum timing $\theta_{max}$ of the engine rotational speed and the initial combustion position MFB 10 is obtained in advance by calibration or the like, the current initial combustion position MFB 10$_{current}$ can be obtained using the correlation line between the maximum timing $\theta_{max}$ of the engine rotational speed and the initial combustion position MFB 10 illustrated in FIG. 15 from the maximum timing $\theta_{max\_current}$ of the current engine rotational speed. The current initial combustion period$_{\Delta\theta ig10\_current}$ can also be determined by subtracting the current ignition timing $\theta_{ig\_current}$ from the MFB 10$_{current}$.

The combustion phase calculation unit 122*c* obtains the current combustion centroid position MFB 10$_{current}$ and the initial combustion period$_{\Delta\theta ig10\_current}$ for each cylinder in a similar procedure, and passes them to the engine control unit 122*d* of the controller 12.

Further, the initial combustion position MFB 10 can be obtained using the minimum timing $\theta_{min}$ of the engine rotational speed.

Figure 16:
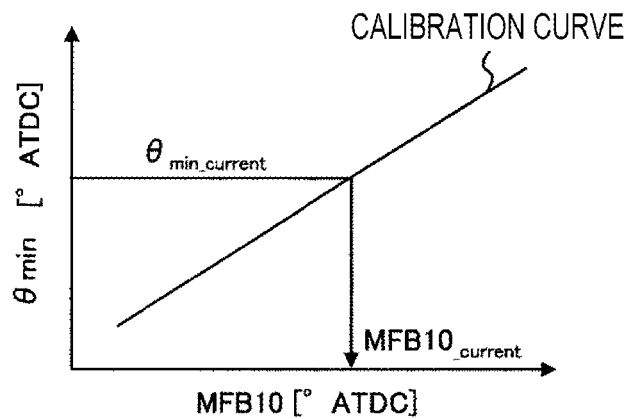
FIG. 16 is an explanatory diagram illustrating a method of obtaining an initial combustion position from the minimum speed timing according to the embodiment of the present invention.

FIG. 16 is a diagram illustrating a correlation between the minimum timing $\theta_{min}$ of the engine rotational speed and the initial combustion position MFB 10. There is a strong correlation between the minimum timing $\theta_{min}$ of the engine rotational speed and the initial combustion position MFB 10, and the relationship between the minimum timing $\theta_{min}$ and the combustion centroid position MFB is substantially linear as illustrated in FIG. 16. Therefore, if the correlation line between the minimum timing $\theta_{min}$ of the engine rotational speed and the initial combustion position MFB 10 is obtained in advance by calibration or the like, the current initial combustion position MFB 10$_{current}$ can be obtained using the correlation line between the minimum timing $\theta_{min}$ of the engine rotational speed and the initial combustion position MFB 10 illustrated in FIG. 16 from the minimum timing $\theta_{min\_current}$ of the current engine rotational speed. The current initial combustion period$_{\Delta\theta ig10\_current}$ can also be determined by subtracting the current ignition timing $\theta_{ig\_current}$ from the MFB 10$_{current}$.

The combustion phase calculation unit 122*c* obtains the current combustion centroid position MFB 10$_{current}$ and the initial combustion period$_{\Delta\theta ig10\_current}$ for each cylinder in a similar procedure, and passes them to the engine control unit 122*d* of the controller 12. As described above, the internal combustion engine control unit (ECU 12) of the present embodiment includes a rotational speed calculation unit 122*a* that calculates a crank rotational speed of an internal combustion engine (engine 1); an extreme value timing calculation unit 122*b* that calculates an extreme value timing of the crank rotational speed calculated by the rotational speed calculation unit 122a; and a combustion state estimation unit (combustion phase calculation unit 122c) that estimates a combustion state based on the extreme value timing of the crank speed calculated by the extreme value timing calculation unit 122b.

[Engine Control Unit]

Next, control of the engine by the engine control unit 122d will be described.

In order to increase the thermal efficiency of the engine, it is necessary to appropriately control the combustion phase. If the combustion phase is too early, work of compressing the gas in the compression stroke increases, so that the loss increases. In addition, when the combustion phase is too slow, the exhaust temperature rises, and the heat loss due to the exhaust increases. Since the combustion phase at which the thermal efficiency is maximized is defined by the combustion centroid position MFB 50, the thermal efficiency of the engine can be increased by controlling the ignition timing so that the combustion centroid position MFB 50 becomes a defined value. Therefore, the engine control unit 122d performs engine control based on the combustion centroid position MFB 50.

Figure 17:
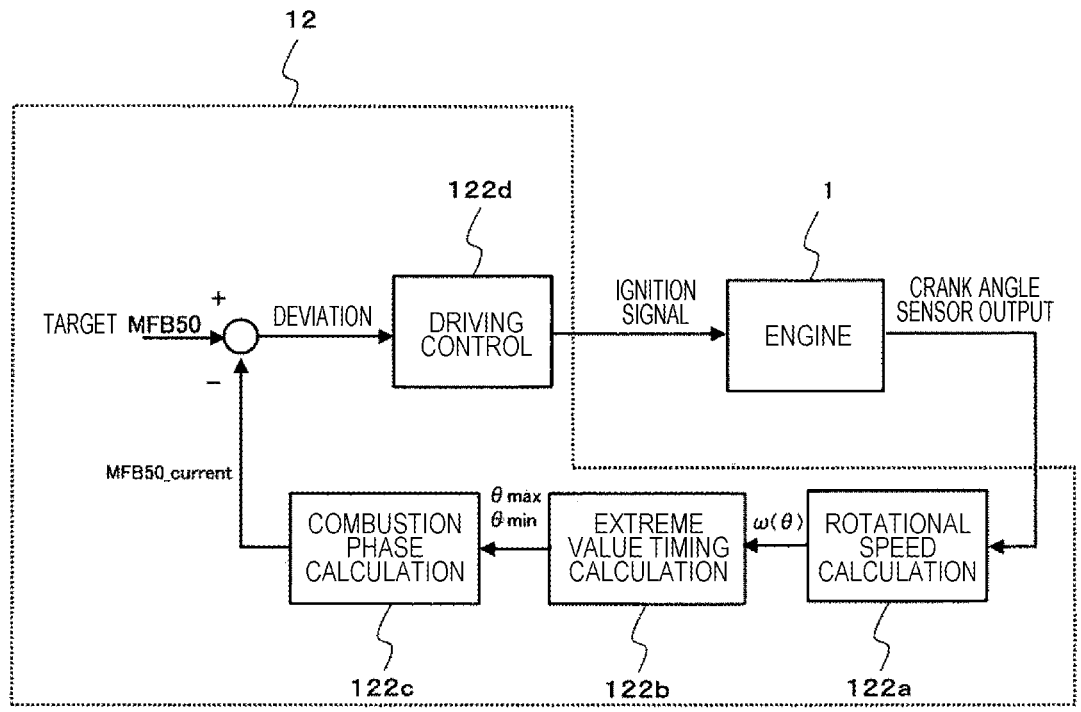
FIG. 17 is an explanatory diagram illustrating an ignition timing control block according to an embodiment of the present invention.

FIG. 17 is a control block view of the ignition timing in the controller 12. In the control of the ignition timing in the controller 12, the ignition timing is calculated by the engine control unit 122d based on the deviation between the current MFB $50\_{current}$ calculated by the combustion phase calculation unit 122c and the target MFB 50, and an ignition signal is sent to the engine 1 at the calculated ignition timing.

The engine control unit 122d is configured by a PID controller, and adjusts the ignition timing so that the deviation between MFB $50\_{current}$ and the target MFB 50 becomes small. More specifically, when the MFB $50\_{current}$ is retarded from the target MFB 50, the ignition timing is advanced to advance the combustion phase. Further, when the MFB $50\_{current}$ is advanced more than the target MFB 50, the ignition timing is delayed in order to delay the combustion phase.

The internal combustion engine control unit (ECU 12) of the present embodiment includes an engine control unit 122d that performs combustion control of the internal combustion engine (engine 1) based on the combustion state estimated by the combustion state estimation unit (combustion phase calculation unit 122c). It is also desirable that the internal combustion engine (engine 1) be configured to drive a generator 3 of a series hybrid system.

In addition, the combustion state estimation unit (combustion phase calculation unit 122c) of the internal combustion engine control unit (ECU 12) estimates the combustion phase at which the combustion mass ratio of the internal combustion engine (engine 1) becomes a set value based on the timing at which the crank rotational speed becomes maximum or minimum, and the engine control unit 122d performs combustion control of the internal combustion engine (engine 1) so that the estimated combustion phase becomes a set phase. The engine control unit 122d controls the ignition timing of the internal combustion engine (engine 1) so that the estimated combustion phase becomes the set phase. Specifically, the combustion state estimation unit (combustion phase calculation unit 122c) calculates a combustion phase (combustion centroid position MFB 50) at which the combustion mass ratio is 50% and a combustion phase (initial combustion position MFB 10) at which the combustion mass ratio is 10%. Then, the engine control unit 122d desirably controls the ignition timing so that the estimated combustion phase (combustion centroid position MFB 50) becomes, for example, 8° to 15° after the top dead center. In addition, the engine control unit 122d desirably controls the ignition timing so that the estimated combustion phase (initial combustion position MFB 10) is, for example, within 15° after ignition.

That is, the engine control unit 122d controls the EGR valve opening of the internal combustion engine (engine 1) so that the estimated combustion phase (initial combustion position MFB 10) becomes the set phase (for example, within 15° after ignition). When the estimated combustion phase (initial combustion position MFB 10) is delayed from the set phase (for example, within 15° after ignition), the engine control unit 122d controls the EGR valve opening of the internal combustion engine (engine 1) in a closing direction.

When the estimated combustion phase (combustion centroid position MFB 50, initial combustion position MFB 10) is delayed from the set phase, the engine control unit 122d controls the ignition timing of the internal combustion engine (engine 1) to be advanced. Conversely, when the estimated combustion phase (combustion centroid position MFB 50, initial combustion position MFB 10) is ahead of the set phase, the engine control unit 122d controls the ignition timing of the internal combustion engine (engine 1) to be retarded.

Since the combustion phase calculation unit 122c obtains the current combustion centroid position MFB $50\_{current}$ for each cylinder, it is preferable to control the ignition timing based on MFB $50\_{current}$ for each cylinder. In the multi-cylinder engine, the combustion phase may be different between the cylinders due to variations in the intake air amount and the like. However, by controlling the ignition timing for each cylinder based on the MFB $50\_{current}$ of each cylinder, the combustion phase of each cylinder can be optimized, and thermal efficiency and emission performance can be improved. Further, the cylinder average MFB $50\_{current}$ may be obtained from the MFB $50\_{current}$ of each cylinder, and the ignition timing may be controlled based on this. In this case, the ignition timings of all the cylinders are the same, and there is a possibility that thermal efficiency and emission performance are lowered as compared with a case where the ignition timing is controlled for each cylinder, but there is an advantage that the control is simplified.

Next, control of another engine by the engine control unit 122d will be described.

Exhaust gas recirculation (EGR) control in which exhaust gas is mixed with intake air of an engine in order to increase thermal efficiency of the engine is widely performed. When the EGR is introduced, the intake gas amount into the cylinder increases, so that the pumping loss in the partial load can be reduced. In addition, since the combustion temperature is lowered by the inert gas, the cooling loss can be reduced. The EGR is also effective in suppressing knocking at a high load. In general, the effect of the EGR increases as the ratio of the EGR (EGR rate) to the intake gas increases. On the other hand, when the EGR rate increases, combustion becomes unstable, and concerns such as misfire and an increase in emissions increase.

Figure 18:
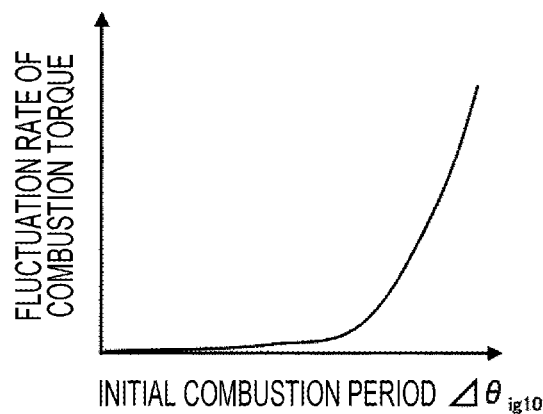
FIG. 18 is a characteristic diagram illustrating a relationship between an initial combustion period and a fluctuation rate of a combustion torque.

FIG. 18 illustrates an example of a relationship between an initial combustion period $\Delta\theta_{ig10}$ and a cycle fluctuation rate of a combustion torque. The initial combustion period $\Delta\theta_{ig10}$ indicates the ease of ignition of the air-fuel mixture, and a large $\Delta\theta_{ig10}$ indicates a low ignition quality of the air-fuel mixture. Therefore, when $\Delta\theta_{ig10}$ increases, misfire is likely to occur, and the cycle fluctuation of the combustion torque increases. In particular, when $\Delta\theta_{ig10}$ is larger than a predetermined value, the misfire cycle is rapidly increased, and the increase in torque fluctuation is accelerated.

As described above, since the instability of combustion due to EGR is defined by the initial combustion period $\Delta\theta_{ig10}$, by controlling the EGR rate so that the initial combustion period $\Delta\theta_{ig10}$ becomes a prescribed value, it is possible to increase the thermal efficiency of the engine while preventing misfire and deterioration of emissions. Therefore, the engine control unit 122d performs engine control based on the initial combustion period $\Delta\theta_{ig10}$.

The combustion state estimation unit of the control unit 122 estimates an initial combustion period $\Delta\theta_{ig10}$ of the internal combustion engine (engine 1) based on the timing at which the crank rotational speed becomes maximum or minimum, and the engine control unit 122d performs combustion control of the internal combustion engine (engine 1) such that the estimated initial combustion period $\Delta\theta_{ig10}$ becomes a set initial combustion period. Specifically, the engine control unit 122d controls the EGR valve opening of the internal combustion engine (engine 1) in the closing direction when the estimated initial combustion period $\Delta\theta_{ig10}$ is longer than the set initial combustion period. When the estimated initial combustion period $\Delta\theta_{ig10}$ is shorter than the set initial combustion period, the engine control unit 122d controls the EGR valve opening of the internal combustion engine (engine 1) in the closing direction.

Figure 19:
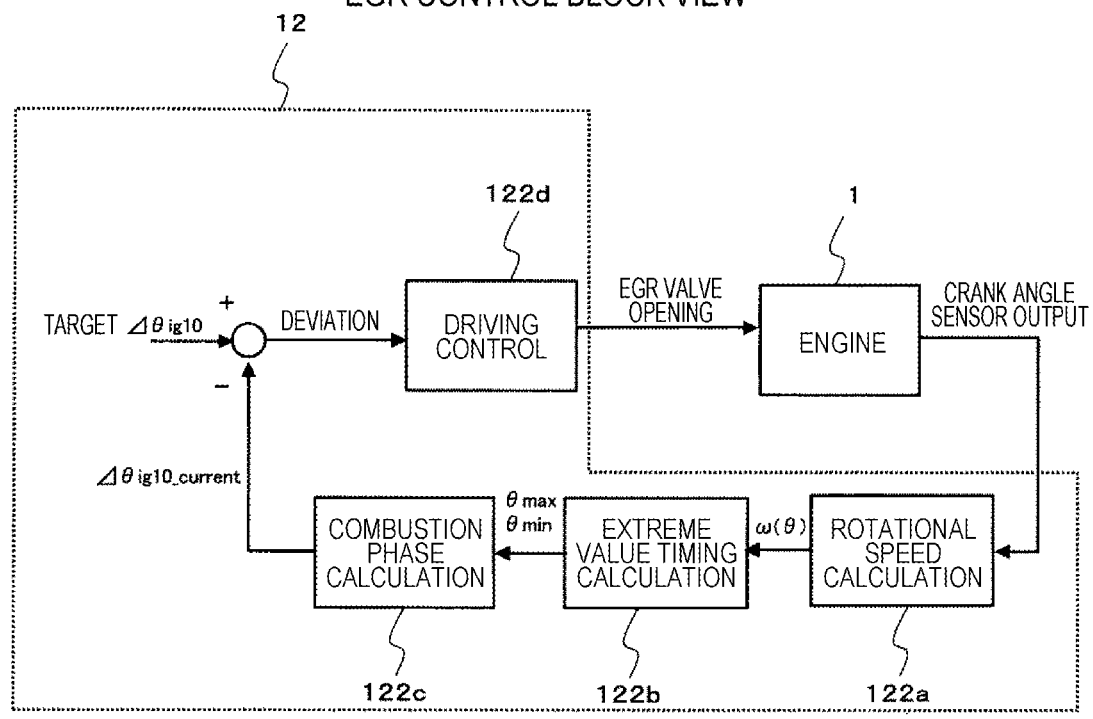
FIG. 19 is an explanatory diagram illustrating an EGR control block according to an embodiment of the present invention.

FIG. 19 is a control block view of EGR in the controller 12. In the control of the EGR in the controller 12, the EGR valve opening is calculated by the engine control unit 122d based on the deviation between the current initial combustion period $\Delta\theta_{ig10\_current}$ calculated by the combustion phase calculation unit 122c and the target $\Delta\theta_{ig10}$, and the engine 1 is operated at the calculated EGR valve opening. As the initial combustion period $\Delta\theta_{ig10\_current}$, the largest $\Delta\theta_{ig10\_current}$ is selected from the initial combustion period $\Delta\theta_{ig10\_current}$ of each cylinder, and the EGR control is performed based on this. The reason why the largest $\Delta\theta_{ig10\_current}$ is selected here is that, as described above, combustion stability tends to deteriorate rapidly with respect to an increase in the initial combustion period $\Delta\theta_{ig10}$, and improvement of the stability of the cylinder having the largest $\Delta\theta_{ig10\_current}$ is prioritized. The engine control unit 122d controls the EGR valve opening of the internal combustion engine (engine 1) so that the estimated combustion phase is the initial combustion period of each cylinder and the largest initial combustion period among the initial combustion periods of each cylinder is the set phase.

The engine control unit 122d is configured by a PID controller, and adjusts the EGR valve opening so that the deviation between $\Delta\theta_{ig10\_current}$ and the target $\Delta\theta_{ig10}$ becomes small. More specifically, when $\Delta\theta_{ig10\_current}$ is larger than the target $\Delta\theta_{ig10}$, the EGR valve opening is reduced in order to reduce the EGR rate. When $\Delta\theta_{ig10\_current}$ is smaller than the target $\Delta\theta_{ig10}$, the EGR valve opening is increased to increase the EGR rate.

By controlling EGR based on the current initial combustion period $\Delta\theta_{ig10\_current}$ in this manner, the EGR rate can be maximized without impairing combustion stability, and the efficiency of the engine can be increased.

In the present invention, the combustion phase is obtained based on the maximum timing of the engine rotational speed. Therefore, since the differential processing for obtaining the engine rotational acceleration is unnecessary as in the conventional technique, there is an advantage that it is hardly affected by disturbance such as noise. In addition, since the differential processing is unnecessary, the configuration of the controller becomes simpler, and there is also an advantage that the number of software creation steps and the circuit cost are reduced.

The present invention is not limited to the above-described embodiments, and various other application examples and modifications can be taken without departing from the gist of the present invention described in the claims.

For example, in the above-described embodiment, an application case of the present invention to a series hybrid vehicle has been described, but the present invention is not limited thereto. For example, the present invention can be applied to a parallel hybrid vehicle or an engine-dedicated vehicle.

In addition, a part or all of each configuration, function, processing unit, and the like of the controller 12 may be realized by hardware, for example, by designing with an integrated circuit.

REFERENCE SIGNS LIST 1 engine
3 induction generator
5 battery
7 induction motor
10 knock sensor
11 crank angle sensor
12 controller
17 ignition plug
20 throttle valve
26 timing rotor
28 EGR pipe
29 EGR valve
122 control unit
121 input/output unit
122a rotational speed calculation unit
122b extreme value timing calculation unit
122c combustion phase calculation unit
122d engine control unit
123 storage unit

The invention claimed is:

1. An internal combustion engine control unit comprising:
a rotational speed calculation unit that calculates a crank rotational speed of an internal combustion engine;
an extreme value timing calculation unit that calculates an extreme value timing of the crank rotational speed calculated by the rotational speed calculation unit;
a combustion phase calculation unit that calculates a combustion phase at a predetermined combustion mass ratio of the internal combustion engine based on the extreme value timing of the crank rotational speed calculated by the extreme value timing calculation unit;
an engine control unit that performs combustion control of the internal combustion engine based on the combustion phase calculated by the combustion phase calculation unit; and
a storage unit that stores correlation characteristics between the extreme value timing of the crank rotational speed and the combustion phase, that have been obtained in advance, wherein
the combustion phase calculation unit obtains a current combustion phase by checking the extreme value timing of the crank rotational speed against the correlation characteristics, and
the engine control unit performs the combustion control of the internal combustion engine so that the current combustion phase approaches a target combustion phase according to a predetermined operating state.

2. The internal combustion engine control unit according to claim 1, wherein the internal combustion engine is configured to drive a generator of a series hybrid system.

3. The internal combustion engine control unit according to claim 1, wherein a changing mode of the crank rotational speed with respect to a change of a crank angle of the internal combustion engine is configured to be sinusoidal.

4. The internal combustion engine control unit according to claim 1, wherein the engine control unit controls an ignition timing of the internal combustion engine so that the calculated combustion phase becomes a set phase.

5. The internal combustion engine control unit according to claim 1, wherein when the calculated combustion phase is delayed from the a set phase, the engine control unit controls an ignition timing of the internal combustion engine to be advanced.

6. The internal combustion engine control unit according to claim 1, wherein the engine control unit controls an EGR valve opening of the internal combustion engine so that the calculated combustion phase becomes a set phase.

7. The internal combustion engine control unit according to claim 6, wherein the engine control unit controls the EGR valve opening of the internal combustion engine so that the calculated combustion phase is an initial combustion period of each cylinder and a largest initial combustion period among the initial combustion periods of the cylinders is the set phase.

8. The internal combustion engine control unit according to claim 1, wherein when the calculated combustion phase is delayed from a set phase, the engine control unit controls an EGR valve opening of the internal combustion engine in a closing direction.

9. The internal combustion engine control unit according to claim 1, wherein the combustion phase calculation unit estimates an initial combustion period of the internal combustion engine based on a timing at which a crank rotational speed becomes maximum or minimum, and the engine control unit performs combustion control of the internal combustion engine so that an estimated initial combustion period becomes a set initial combustion period.

10. The internal combustion engine control unit according to claim 9, wherein the engine control unit controls an EGR valve opening of the internal combustion engine in a closing direction when the estimated initial combustion period is longer than the set initial combustion period.

11. The internal combustion engine control unit according to claim 1, wherein the rotational speed calculation unit calculates the crank rotational speed by expanding a time-series value of the crank rotational speed obtained from a rotation angle sensor in a finite order Fourier series.

12. The internal combustion engine control unit according to claim 11, wherein a truncation order of the Fourier series expansion is increased when the crank rotational speed is increased.

13. The internal combustion engine control unit according to claim 1, wherein the extreme value timing calculation unit divides a period of a crank rotational speed time-series value in a period for crank angle of 720° by the number of cylinders, allocates the crank rotational speed time-series value in each period including a compression top dead center of each cylinder, obtained by dividing, as the crank rotational speed time-series value in each cylinder corresponding to the each period obtained by dividing, and calculates the extreme value timing of the crank rotational speed for each cylinder from the crank rotational speed time-series value allocated to each cylinder.

14. The internal combustion engine control unit according to claim 1, wherein the extreme value timing calculation unit approximates a time-series value of the crank rotational speed using a continuous function from a discrete time-series value of the crank rotational speed, and calculates the extreme value timing of the crank rotational speed using the continuous function.

* * * * *